US012564286B2

(12) United States Patent
Lee et al.

(10) Patent No.: US 12,564,286 B2
(45) Date of Patent: Mar. 3, 2026

(54) INTELLIGENT HEAT-PRESERVING POT COVER AND HEAT-PRESERVING METHOD THEREOF

(71) Applicant: JIANGMEN YISHAN METAL PRODUCTS CO., LTD., Jiangmen (CN)

(72) Inventors: Changho Lee, Jiangmen (CN); Wonyoung Lee, Jiangmen (CN)

(73) Assignee: JIANGMEN YISHAN METAL PRODUCTS CO., LTD., Jiangmen (CN)

( * ) Notice: Subject to any disclaimer, the term of this patent is extended or adjusted under 35 U.S.C. 154(b) by 343 days.

(21) Appl. No.: 18/236,608

(22) Filed: Aug. 22, 2023

(65) Prior Publication Data

US 2024/0398160 A1     Dec. 5, 2024

(30) Foreign Application Priority Data

Jun. 5, 2023    (CN) .......................... 202310662452.5

(51) Int. Cl.
A47J 36/06        (2006.01)
A23B 2/00        (2025.01)
(Continued)

(52) U.S. Cl.
CPC .............. A47J 36/06 (2013.01); A23B 2/003 (2025.01); A23B 2/53 (2025.01); A47J 36/2483 (2013.01);
(Continued)

(58) Field of Classification Search
CPC ...... A47J 36/2483; A47J 36/321; A47J 36/38; A47J 2202/00; A47J 36/32;
(Continued)

(56) References Cited

U.S. PATENT DOCUMENTS 6,497,907 B2 * 12/2002 Hofer ........................ A21B 1/40
                                                        126/369
9,930,990 B1 * 4/2018 Gupta ..................... A47J 36/02
(Continued)

OTHER PUBLICATIONS

Translation of CN 115137223A (Year: 2022).*
(Continued)

Primary Examiner — Drew E Becker
(74) Attorney, Agent, or Firm — Olson & Cepuritis, Ltd.

(57)        ABSTRACT

An intelligent heat-preserving pot cover includes a cover body, a top portion of the cover body is connected with a temperature control body, a ventilation hood is arranged between the cover body and the temperature control body. A through hole is arranged at the top portion of the cover body, the temperature control body is provided with a heating tube and an ultraviolet lamp tube via a mounting column passing through the through hole. A water tank is arranged in the temperature control body, and a spray pipe is led out of the water tank and passes through the through hole. The temperature control body is provided with a temperature sensor, a humidity sensor and a controller, and the controller is configured for controlling the heating tube, the ultraviolet lamp tube and the spray pipe to work according to data of the temperature sensor and the humidity sensor.

9 Claims, 3 Drawing Sheets

(51) Int. Cl.

| | | |
|---|---|---|
| *A23B 2/53* | (2025.01) | |
| *A47J 36/24* | (2006.01) | |
| *A47J 36/32* | (2006.01) | |
| *A47J 36/38* | (2006.01) | |

(52) U.S. Cl.

CPC ............. *A47J 36/321* (2018.08); *A47J 36/38* (2013.01); *A47J 2202/00* (2013.01)

(58) Field of Classification Search

CPC .................. A47J 2027/043; A47J 27/10; A47J 36/06–12; A23B 2/003; A23B 2/53; A23B 2/05

See application file for complete search history.

(56) References Cited

U.S. PATENT DOCUMENTS

| | | | | |
|---|---|---|---|---|
| 11,737,601 | B1 * | 8/2023 | Bien-Aime | ........... A47J 37/041 |
| | | | | 126/41 R |
| 12,349,833 | B1 * | 7/2025 | Hanson | ................ H05B 1/0261 |
| 2009/0249963 | A1 * | 10/2009 | Linskens | ................. A47F 3/001 |
| | | | | 236/44 C |

| | | | | |
|---|---|---|---|---|
| 2013/0061765 | A1 * | 3/2013 | Reinhart | ............... F24C 15/001 |
| | | | | 236/49.5 |
| 2016/0088868 | A1 * | 3/2016 | Dobrinsky | ............... A23B 2/53 |
| | | | | 250/492.1 |
| 2017/0332841 | A1 * | 11/2017 | Reischmann | .......... G01N 33/02 |
| 2020/0146497 | A1 * | 5/2020 | Shi | ............................ A23L 5/12 |
| 2020/0205595 | A1 * | 7/2020 | He | ........................... A47J 36/06 |
| 2021/0137298 | A1 * | 5/2021 | Zakowski | ............... A47J 36/16 |
| 2021/0228014 | A1 * | 7/2021 | Rana | ....................... A47J 27/18 |
| 2021/0338006 | A1 * | 11/2021 | Al-Ahdal | ............. A47J 27/004 |
| 2022/0117439 | A1 * | 4/2022 | Mo | ......................... A47J 36/32 |
| 2022/0125240 | A1 * | 4/2022 | McCullough | ........... A47J 36/32 |
| 2022/0151429 | A1 * | 5/2022 | Harris | ..................... A47J 36/38 |
| 2024/0306676 | A1 * | 9/2024 | Ukai | ...................... A23B 2/003 |
| 2024/0306677 | A1 * | 9/2024 | Bastarrachea Gutiérrez | ............... A23B 2/97 |
| 2025/0185675 | A1 * | 6/2025 | Ukai | ......................... A23B 2/40 |
| 2025/0275646 | A1 * | 9/2025 | Bressan | .................. A47J 36/06 |

OTHER PUBLICATIONS

Translation of CN 106798503A (Year: 2017).*
Translation of N 106913198A (Year: 2017).*
Translation of CN 108814313A (Year: 2018).*

* cited by examiner

INTELLIGENT HEAT-PRESERVING POT COVER AND HEAT-PRESERVING METHOD THEREOF

CROSS-REFERENCE TO RELATED APPLICATION

This application is based on and claims the benefit of priority from Chinese Patent Application No. 2023106624525, filed on 5 Jun. 2023, the entirety of which is incorporated by reference herein.

TECHNICAL FIELD

The present invention relates to the technical field of smart household appliances, and particularly relates to an intelligent heat-preserving pot cover and a heat-preserving method thereof.

BACKGROUND

At present, in order to ensure that the dishes may not become cold when the temperature is low, people usually put the dishes on a heating plate to keep them warm, but the existing heating plate cannot guarantee the freshness of food. Due to long-term heating, the water in the dishes will lose a lot, which will lead to the poor taste of the food. In addition, the heating plate cannot prevent bacteria from destroying the food quality, and easily leads to the proliferation of bacteria in the case of long time heat-preserving, thus producing carcinogens.

SUMMARY

The present invention aims at solving at least one of the technical problems in the existing technology Therefore, the present invention provides an intelligent heat-preserving pot cover and a heat-preserving method thereof.

In a first aspect, an embodiment of the present invention provides an intelligent heat-preserving pot cover, which comprises a cover body, wherein a top portion of the cover body is connected with a temperature control body, a ventilation hood is arranged between the cover body and the temperature control body; a through hole is arranged at the top portion of the cover body, the temperature control body is provided with a heating tube and an ultraviolet lamp tube via a mounting column passing through the through hole, a water tank is arranged in the temperature control body, and a spray pipe is led out of the water tank and passes through the through hole; and the temperature control body is provided with a temperature sensor, a humidity sensor and a controller, and the controller is configured for controlling the heating tube, the ultraviolet lamp tube and the spray pipe to work according to data of the temperature sensor and the humidity sensor.

According to some embodiments of the present invention, the temperature control body is connected with a clamping plate via a pull rod passing through the through hole, and the clamping plate presses against a bottom portion of the cover body.

According to some embodiments of the present invention, an air-permeable plate is provided below the heating tube and the ultraviolet lamp tube, and the air-permeable plate is mounted on the pull rod.

According to some embodiments of the present invention, the temperature control body is provided with an exhaust fan via a rotating shaft passing through the through hole.

According to some embodiments of the present invention, the exhaust fan is provided with double-layer fan blades, an upper-layer fan blade is arranged in a middle space of the ventilation hood, and a lower-layer fan blade is arranged below the clamping plate and above the heating tube and the ultraviolet lamp tube.

According to some embodiments of the present invention, the temperature control body is further provided with an Internet of Things communication module for communicating with a server, a mobile terminal or a smart home control module, and the controller is configured for controlling the heating tube, the ultraviolet lamp tube and the spray pipe to work according to an Internet of Things control signal sent by the Internet of Things communication module.

According to some embodiments of the present invention, the temperature control body is provided with a handle, and the handle is capable of being accommodated in a groove of the temperature control body.

According to some embodiments of the present invention, a heat-preserving indicator lamp and a disinfection indicator lamp are arranged on the temperature control body.

According to some embodiments of the present invention, a heat-preserving control knob, a disinfection control knob and a water adding button are arranged on the temperature control body.

In a second aspect, an embodiment of the present invention provides a heat-preserving method of the intelligent heat-preserving pot cover, wherein the method comprises:

1) detecting, by the temperature sensor, a temperature in the pot, and when the temperature in the pot is lower than a preset minimum heat-preserving temperature value, controlling, by the controller, the heating tube to start operation, and when the temperature in the pot is higher than a preset maximum heat-preserving temperature value, controlling, by the controller, the heating tube to stop operation;

2) detecting, by the humidity sensor, a humidity in the pot, when the humidity in the pot is lower than a preset minimum humidity value, controlling, by the controller, the spray pipe to start spraying, and when the humidity in the pot is higher than a preset maximum humidity value, controlling, by the controller, the spray pipe to stop spraying; and 3) when the spray pipe starts spraying, controlling, by the controller, the ultraviolet lamp tube to turn on, and after the spraying is finished, controlling, by the controller, the ultraviolet lamp tube to automatically turn off after maintaining a predetermined time.

The present invention at least has the following beneficial effects. The product can control the heating tube, the ultraviolet lamp tube and the spray pipe in an automatic mode or a manual mode, so as to realize three functions of food heat-preserving, ultraviolet disinfection, humidification and freshness preservation, thus ensuring the freshness, quality and taste of the food, and thus being widely used in families.

Additional aspects and advantages of the present invention will be given in part in the following description, and will become apparent in part from the following description, or will be learned through the practice of the present invention.

BRIEF DESCRIPTION OF THE DRAWINGS

The present invention will be further explained with reference to the drawings and embodiments hereinafter, wherein.

DETAILED DESCRIPTION

Figure 1:
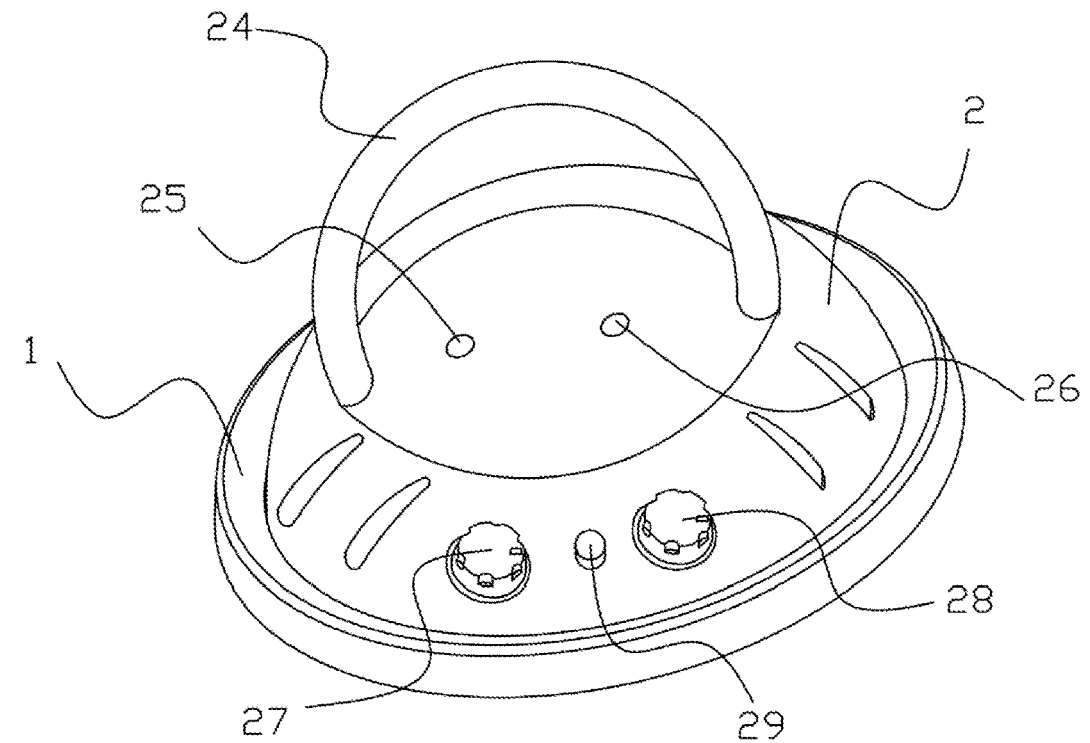
FIG. 1 is a structural schematic diagram of the present invention.

The embodiments of the present invention will be described in detail hereinafter. Examples of the embodiments are shown in the drawings. The same or similar reference numerals throughout the drawings denote the same or similar elements or elements having the same or similar functions. The embodiments described below by reference to the drawings are exemplary and are intended only to explain the present invention and are not to be construed as limiting the present invention.

In the description of the present invention, it should be understood that the orientation or positional relationship indicated by the terms "upper" and "lower" is based on the orientation or positional relationship shown in the drawings, only for the convenience of describing the present invention and simplifying the description, and does not indicate or imply that the indicated device or element must have a specific orientation, or be constructed and operated in a specific orientation. Therefore, the terms should not be construed as limiting the present invention.

In the description of the present invention, a plurality of means two or more. If first and second are described, it is only for the purpose of distinguishing the technical features, and cannot be understood as indicating or implying relative importance, or implicitly indicating the number of technical features indicated thereby, or implicitly indicating the order of technical features indicated thereby.

In the description of the present invention, unless otherwise explicitly defined, words such as setting, mounting and connecting should be understood in a broad sense, and those of ordinary skills in the art can reasonably determine the specific meanings of the above words in the present invention in combination with the specific contents of the technical solutions.

Figure 2:
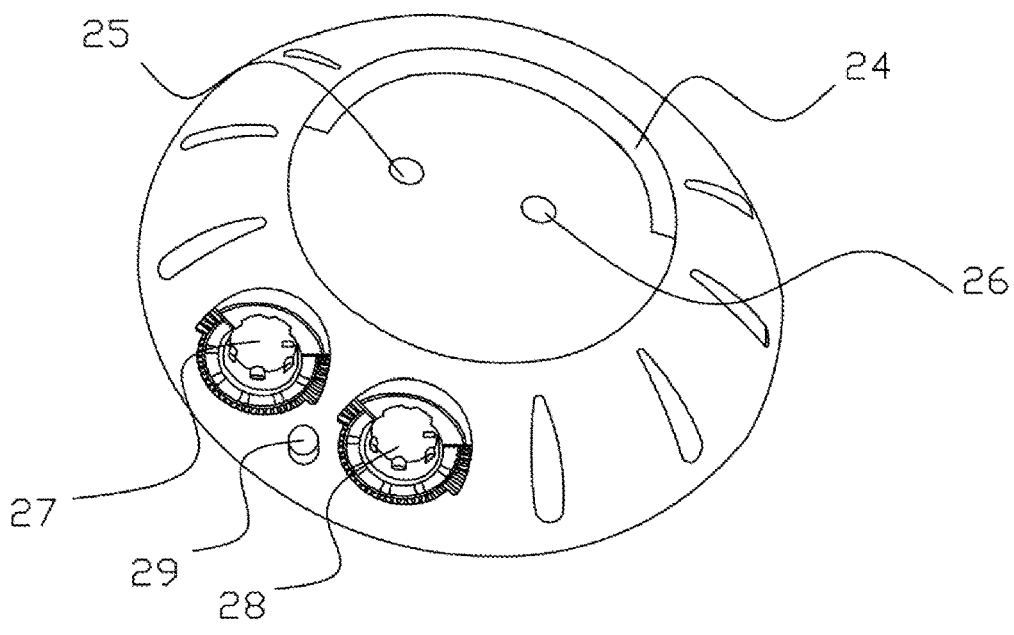
FIG. 2 is a structural schematic diagram of a temperature control body according to the present invention.
Figure 3:
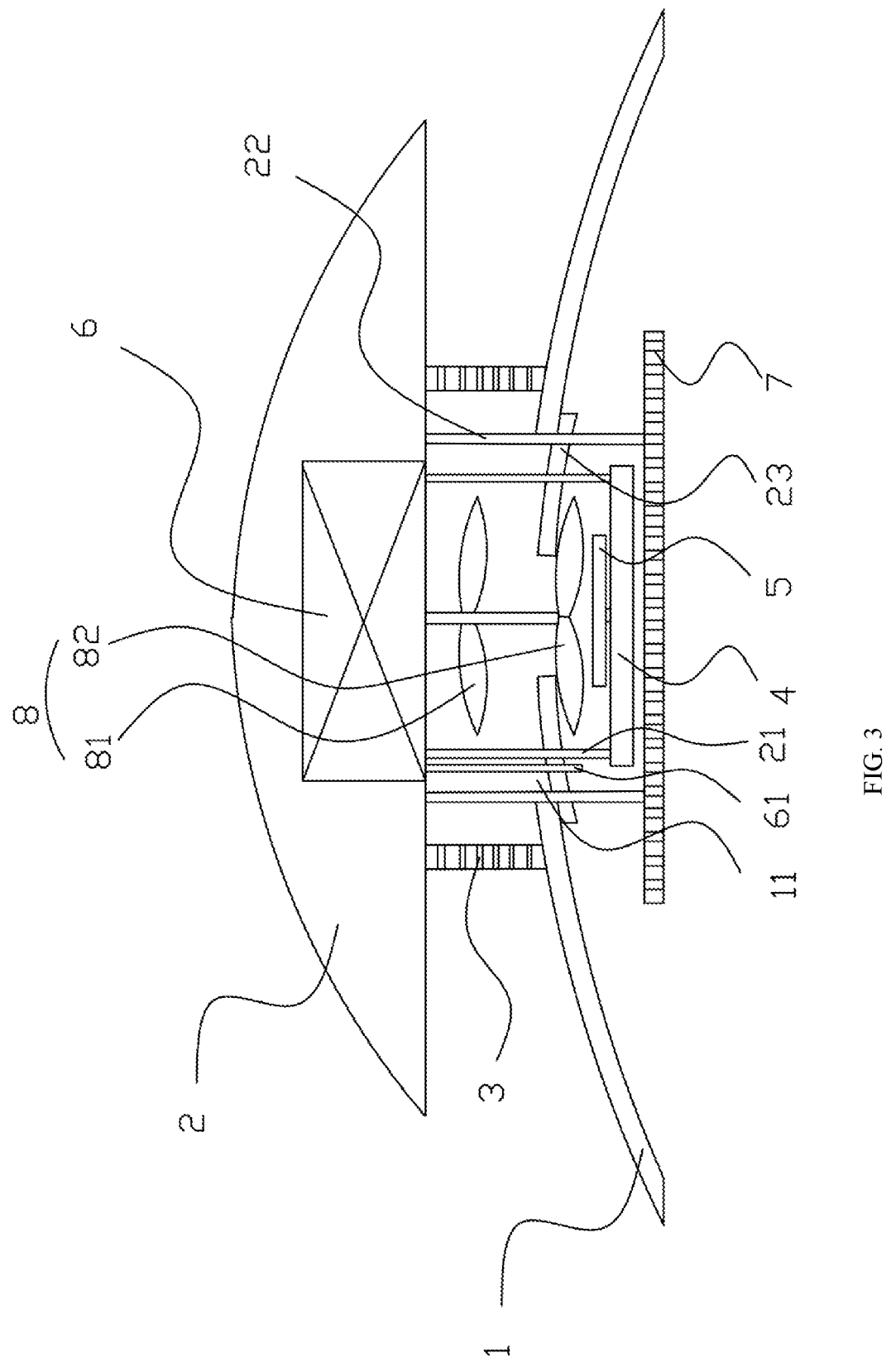
FIG. 3 is an internal sectional view of the present invention.
Figure 4:
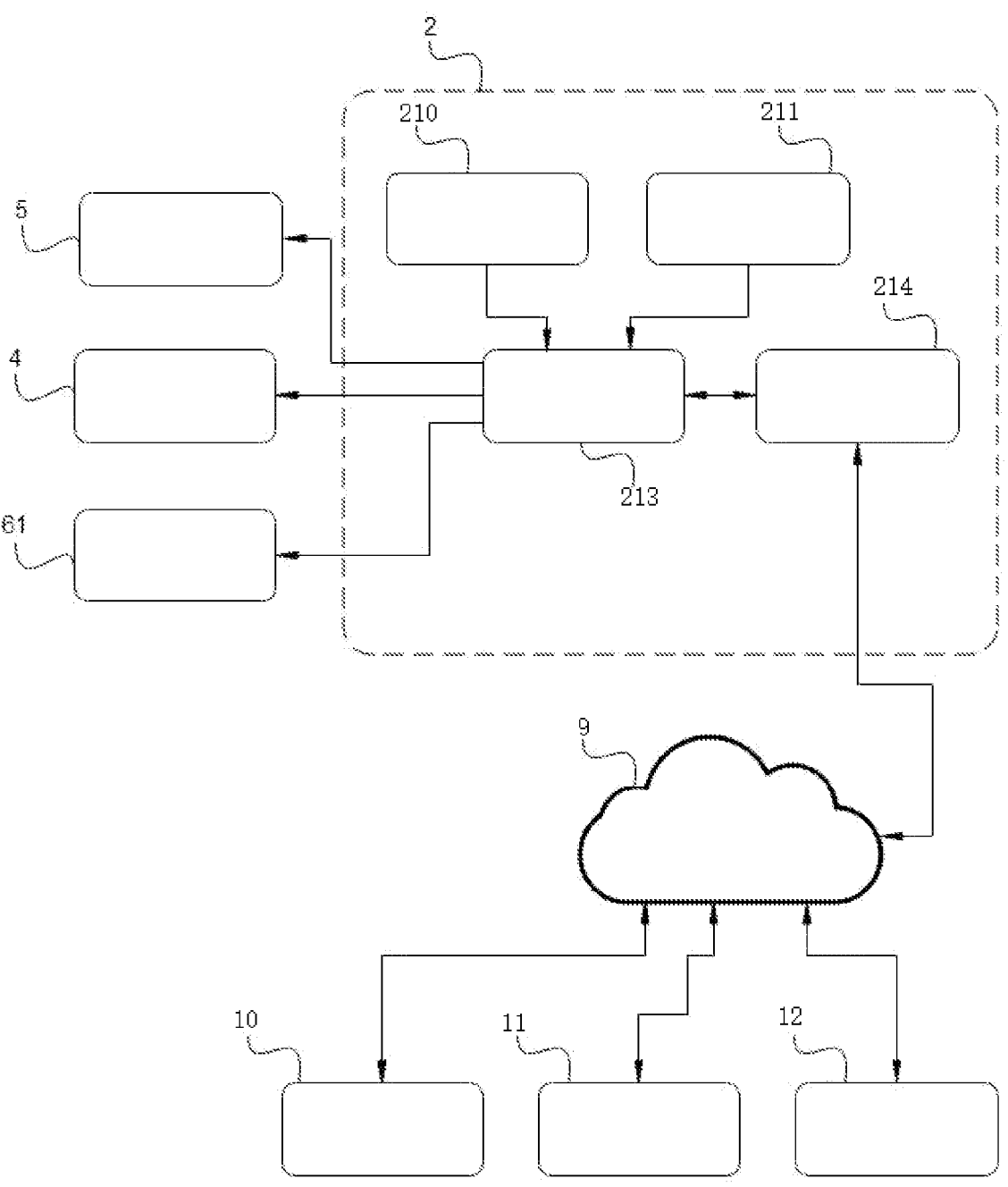
FIG. 4 is a schematic structural diagram of the temperature control body of the present invention.

Referring to FIG. 1, FIG. 2 and FIG. 3, an intelligent heat-preserving pot cover comprises a cover body 1, wherein the cover body 1 is a glass cover, and a top portion of the cover body 1 is connected with a temperature control body 2. A ventilation hood 3 is arranged between the cover body 1 and the temperature control body 2. The ventilation hood 3 mainly discharges heat generated when the temperature control body 2 is working. A through hole 11 is arranged at the top portion of the cover body 1. The temperature control body 2 is provided with a heating tube 4 and an ultraviolet lamp tube 5 via a mounting column 21 passing through the through hole 11. The heating tube 4 may be arranged in an outer circle, and the ultraviolet lamp tube 5 may be arranged in an inner circle. A water tank 6 is arranged in the temperature control body 2, and a spray pipe 61 is led out of the water tank 6 and passes through the through hole 11. The spray pipe 61 is used to spray a small amount of water to ensure the taste of food and avoid the loss of water in the food after long-term heating and heat-preserving.

Referring to FIG. 3, the temperature control body 2 may be mounted in various ways. In this embodiment, the temperature control body 2 is connected with a clamping plate 23 via a pull rod 22 passing through the through hole 11. The clamping plate 23 presses against a bottom portion of the cover body 1. Of course, the temperature control body 2 may be directly mounted on the cover body 1 by a bolt.

In addition, an air-permeable plate 7 is provided below the heating tube 4 and the ultraviolet lamp tube 5, and the air-permeable plate 7 is mounted on the pull rod 22. The use of the air-permeable plate 7 effectively prevents food from directly contacting the heating tube 4 or the ultraviolet lamp tube 5.

The temperature control body 2 is provided with a temperature sensor 210, a humidity sensor 211 and a controller 213, and the controller 213 is configured for controlling the heating tube 4, the ultraviolet lamp tube 5 and the spray pipe 61 to work according to data of the temperature sensor 210 and the humidity sensor 211.

The temperature control body 2 is provided with an exhaust fan 8 via a rotating shaft passing through the through hole 11. The exhaust fan 8 is provided with double-layer fan blades, an upper-layer fan blade 81 is arranged in a middle space of the ventilation hood 3, and a lower-layer fan blade 82 is arranged below the clamping plate 23 and above the heating tube 4 and the ultraviolet lamp tube 5. The upper-layer fan blade 81 can discharge the heat generated during the operation of the temperature control body 2 from the ventilation hood 3, and the lower-layer fan blade 82 blows the heat generated by the heating tube 4 into the pot, thereby raising the temperature in the pot.

The temperature control body 2 is provided with a handle 24, and the handle 24 is capable of being accommodated in a groove of the temperature control body 2, thus being convenient to carry and accommodate.

The product has two operation modes, and the first mode is manual operation, wherein a heat-preserving indicator lamp 25 and a disinfection indicator lamp 26 are arranged on the temperature control body 2. A heat-preserving control knob 27, a disinfection control knob 28 and a water adding button 29 are arranged on the temperature control body 2. A user may set a heat-preserving time and a heat-preserving temperature by rotating the heat-preserving control knob 27 according to actual needs, set a disinfection time by rotating the disinfection control knob 28, and realize a water adding function by pressing the water adding button 29.

The other mode is automatic mode, wherein the temperature control body 2 is further provided with an Internet of Things communication module 214 for communicating with a server 11, a mobile terminal 10 or a smart home control module 12, and the controller 213 is configured for controlling the heating tube 4, the ultraviolet lamp tube 5 and the spray pipe 61 to work according to an Internet of Things control signal sent by the Internet of Things communication module 214.

Parameter settings of different foods, such as meat, stir-fried dishes, seafood, etc., are set in the Internet of Things communication module 214. As long as the corresponding signals are sent to the Internet of Things communication module 214 through a mobile phone, the controller 213 can automatically control the heating tube 4, the ultraviolet lamp 5 and the spray pipe 61 to work, such as in a meat heat-preserving mode, which may comprises the steps as follows:

1) detecting, by the temperature sensor 210, a temperature in the pot, and when the temperature in the pot is lower than 50° C., controlling, by the controller 213, the heating tube 4 to start operation, and when the temperature in the pot is higher than 75° C., controlling, by the controller 213, the heating tube 4 to stop operation;

2) detecting, by the humidity sensor 211, a humidity in the pot, when the humidity in the pot is lower than 80%, controlling, by the controller 213, the spray pipe 61 to start spraying, and when the humidity in the pot is higher than 90%, controlling, by the controller 213, the spray pipe 61 to stop spraying; and 3) when the spray pipe 61 starts spraying, controlling, by the controller 213, the ultraviolet lamp tube 5 to turn on, and after the spraying is finished, controlling, by the controller 213, the ultraviolet lamp tube 5 to automatically turn off after maintaining 180 seconds.

The product can control the heating tube 4, the ultraviolet lamp tube 5 and the spray pipe 61 in an automatic mode or a manual mode, so as to realize three functions of food heat-preserving, ultraviolet disinfection, humidification and freshness preservation, thus ensuring the freshness, quality and taste of the food, and thus being widely used in families.

The preferred embodiments of the present invention have been described in detail above. It should be understood that those of ordinary skills in the art can make many modifications and changes according to the concept of the present invention without creative work. Therefore, any technical solution that can be obtained by those of ordinary skilled in the art through logical analysis, reasoning or limited experiments on the basis of the existing technology according to the concept of the present invention shall fall within the protection scope determined by the claims.

What is claimed is:

1. A heat-preserving method, comprising:

providing an intelligent heat-preserving pot cover, comprising a cover body, wherein a top portion of the cover body is connected with a temperature control body, a ventilation hood is arranged between the cover body and the temperature control body, a through hole is arranged at the top portion of the cover body, the temperature control body is provided with a heating tube and an ultraviolet lamp tube via a mounting column passing through the through hole, a water tank is arranged in the temperature control body, and a spray pipe is led out of the water tank and passes through the through hole; and the temperature control body is provided with a temperature sensor, a humidity sensor and a controller, and the controller is configured for controlling the heating tube, the ultraviolet lamp tube and the spray pipe to work according to data of the temperature sensor and the humidity sensor;

detecting, by the temperature sensor, a temperature in the pot, and when the temperature in the pot is lower than a preset minimum heat-preserving temperature value, controlling, by the controller, the heating tube to start operation, and when the temperature in the pot is higher than a preset maximum heat-preserving temperature value, controlling, by the controller, the heating tube to stop operation;

detecting, by the humidity sensor, a humidity in the pot, when the humidity in the pot is lower than a preset minimum humidity value, controlling, by the controller, the spray pipe to start spraying, and when the humidity in the pot is higher than a preset maximum humidity value, controlling, by the controller, the spray pipe to stop spraying; and when the spray pipe starts spraying, controlling, by the controller, the ultraviolet lamp tube to turn on, and after the spraying is finished, controlling, by the controller, the ultraviolet lamp tube to automatically turn off after maintaining a predetermined time.

2. The heat-preserving method according to claim 1, wherein the temperature control body is connected with a clamping plate via a pull rod passing through the through hole, and the clamping plate presses against a bottom portion of the cover body.

3. The heat-preserving method according to claim 2, wherein an air-permeable plate is provided below the heating tube and the ultraviolet lamp tube, and the air-permeable plate is mounted on the pull rod.

4. The heat-preserving method according to claim 3, wherein the temperature control body is provided with an exhaust fan via a rotating shaft passing through the through hole.

5. The heat-preserving method according to claim 4, wherein the exhaust fan is provided with double-layer fan blades, an upper-layer fan blade is arranged in a middle space of the ventilation hood, and a lower-layer fan blade is arranged below the clamping plate and above the heating tube and the ultraviolet lamp tube.

6. The heat-preserving method according to claim 1, wherein the temperature control body is further provided with an Internet of Things communication module for communicating with a server, a mobile terminal or a smart home control module, and the controller is configured for controlling the heating tube, the ultraviolet lamp tube and the spray pipe to work according to an Internet of Things control signal sent by the Internet of Things communication module.

7. The heat-preserving method according to claim 1, wherein the temperature control body is provided with a handle, and the handle is capable of being accommodated in a groove of the temperature control body.

8. The heat-preserving method according to claim 1, wherein a heat-preserving indicator lamp and a disinfection indicator lamp are arranged on the temperature control body.

9. The heat-preserving method according to claim 1, wherein a heat-preserving control knob, a disinfection control knob and a water adding button are arranged on the temperature control body.

* * * * *